Figure 2:
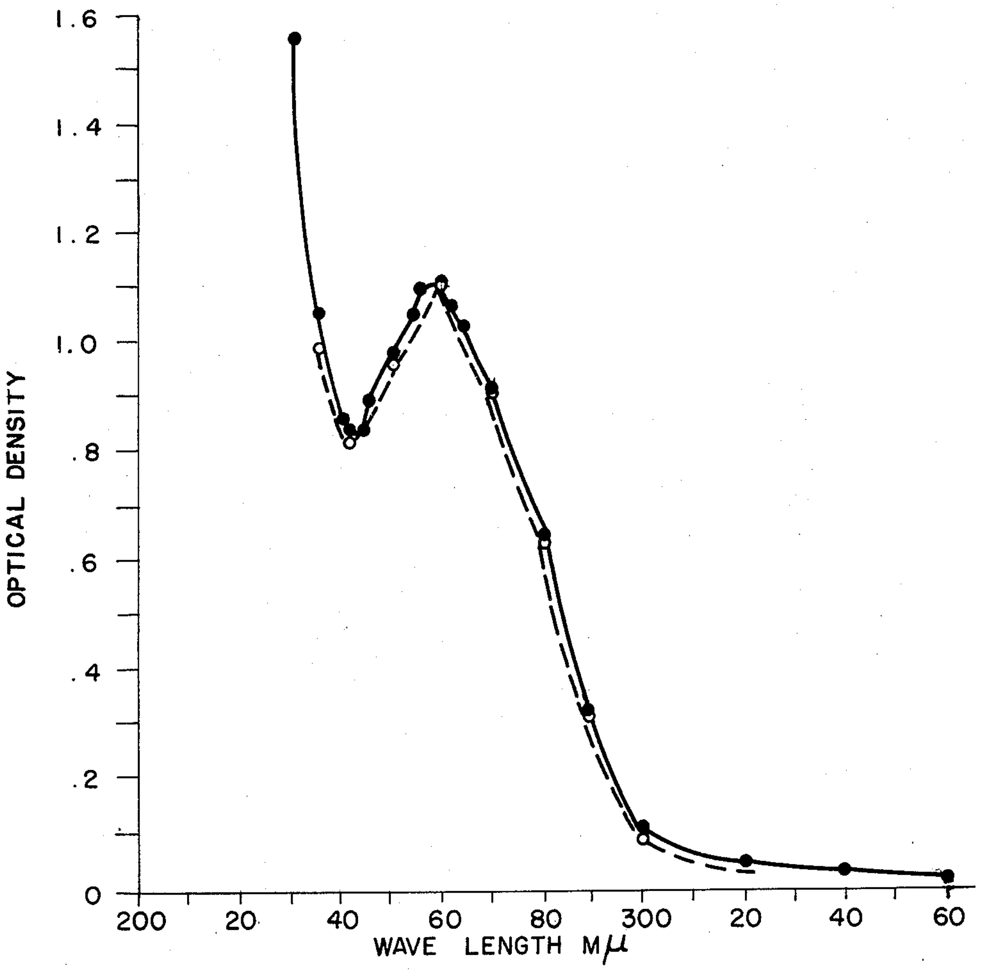

Sept. 1, 1964           J. CHARNEY           3,147,185

PROCESS FOR PURIFYING VIRAL SUBSTANCES AND COMPOSITION

Filed Sept. 10, 1959           4 Sheets-Sheet 1

NUCLEIC ACID PRECIPITATION PROCEDURE FOR PURIFICATION AND CONCENTRATION OF POLIOVIRUS

| | | SCALE OF OPERATION |
|---|---|---|
| | TISSUE CULTURE FLUID FILTRATE CONTAINING POLIOVIRUS | 100 LITERS |
| STEP I | COOL TO BETWEEN 1-10°C., ADD TO 100 μg./ml. NUCLEIC ACID, ADJUST TO pH 2-4, LET STAND ABOUT 18 HOURS. DRAW OFF CLEAR SUPERNATANT, CENTRIFUGE SEDIMENT, WASH SEDIMENT WITH pH 3.5 BUFFER. | 500 ml. |

OPTIONAL STEPS

| | | |
|---|---|---|
| STEP II | DISSOLVE STEP I SEDIMENT IN AQ. BUFFER, pH 4.5-9 DIGEST SOLUTION WITH (1) RIBONUCLEASE OR (2) RIBONUCLEASE AND DEOXYRIBONUCLEASE (ACTIVATED WITH $MgSO_4$) ABOUT 1 HR. AT ABOUT 37° C. | 500 ml. |
| STEP III | DIGEST FURTHUR WITH PURIFIED FICIN (ACTIVATED WITH CYSTEINE) ABOUT 1 HR. AT ABOUT 37° C. | 500 ml. |
| STEP IV | DILUTE DIGESTION MIXTURE WITH 2 VOLS. $H_2O$, ADJUST TO ABOUT pH 3.5, CENTRIFUGE AT LOW SPEED. DISCARD SUPERNATANT, WASH PELLET WITH ABOUT pH 3.5 BUFFER. | 1500 ml. |
| STEP V | DISSOLVE PELLET IN AQ. BUFFER, pH 4.5-9 CENTRIFUGE AT 40,000 RPM, ABOUT 5 HRS. DISCARD SUPERNATANT WASH PELLET WITH AQ. BUFFER, pH 4.5, DISSOLVE PELLET IN AQ. BUFFER, pH 4.5-9 CLARIFY BY CENTRIFUGATION, DISSOLVE AND CLARIFY AGAIN AS ABOVE, DISCARD PELLET. | 40 ml. |
| | CONCENTRATED, PURIFIED VIRUS SOLUTION. | 20 ml. |

INVENTOR

JESSE CHARNEY

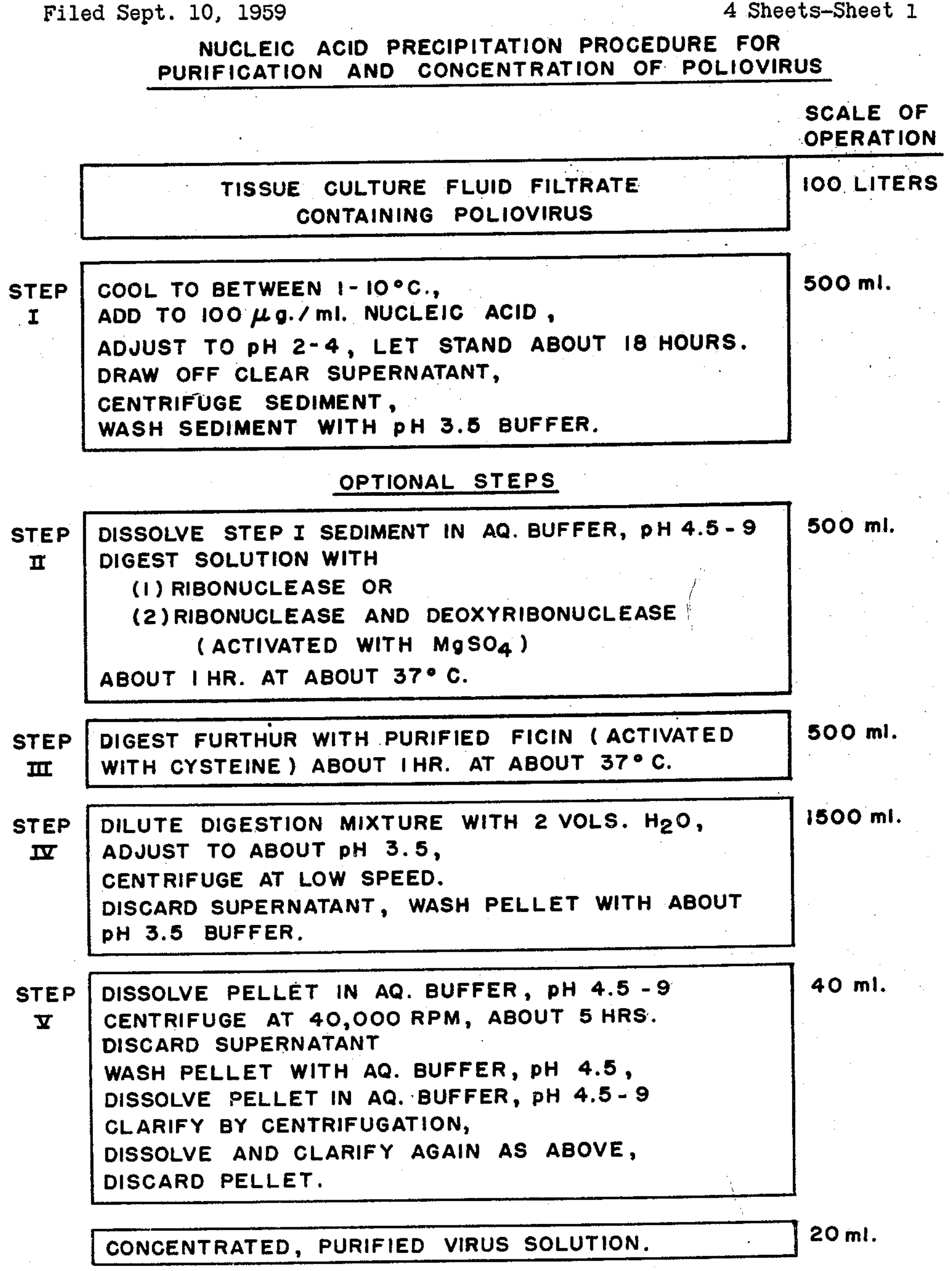

FIG. 1

●———● POLIO VIRUS, 164 mcg./ml., CF/mcg.= 3.7
(purified by process of example 8)

o– – – –o PURE POLIO VIRUS SPECTRUM FROM THE DATA OF
SCHWERDT AND SCHAFFER ①
CONCENTRATION : 164 mcg./ml., CF/mcg.= 3-5

*INVENTOR*
JESSE CHARNEY

INVENTOR
JESSE CHARNEY

*INVENTOR*
JESSE CHARNEY

3,147,185
PROCESS FOR PURIFYING VIRAL SUBSTANCES AND COMPOSITION
Jesse Charney, Lansdale, Pa., assignor to Merck & Co., Inc., Rahway, N.J., a corporation of New Jersey
Filed Sept. 10, 1959, Ser. No. 839,543
7 Claims. (Cl. 167—78)

This invention relates to an improved method for concentrating and purifying viral substances. More particularly it relates to a process of separating, in highly concentrated and purified form, viral substances from viral substance-containing fluids such as tissue culture fluids or vaccines made by the elimination of the infective property of tissue culture fluids by reaction with formaldehyde, long incubation, etc., and further relates to the use of pure concentrated viral substances in the preparation of vaccines, and the vaccines thus produced.

The preparation of vaccines for use in preventing diseases of viral origin, particularly poliomyelitis, has recently been simplified by growing the causative virus in tissue culture. The tissue culture media may be of several types, for example in growing poliomyelitis in monkey kidney tissue culture, the monkey kidneys are either minced or minced and trypsinized. The work described herein was done on minced and trypsinized monkey tissue culture fluids containing poliomyelitis virus (hereinafter referred to as poliovirus) but would be equally applicable to the minced tissue culture fluid with an even greater increase in the purification factor achieved, or to fluids or filtrates obtained from other tissue cultures.

At the end of the poliovirus growth period, tissue culture fluids are extremely dilute solutions of the desired viral substances contaminated with large amounts of impurities, many of them undesirable.

While methods are known which are used to concentrate and purify viral substances from tissue culture filtrates, these require that a large number of procedural steps be employed with the attendant loss in yields and opportunity for contamination. In addition they are tedious and time consuming. For example, the method described by Schwerdt & Schaffer, Annals of the New York Academy of Sciences, volume 61: article 4, page 740 (1955), by which poliovirus was obtained in a pure state, prior to applicant's invention, involved (1) precipitation of the virus in the presence of methanol, filtration of the virus so precipitated with the aid of a carrier (such as Celite), and elution of the filter-cake, done repeatedly; (2) repeated emulsification with butanol to remove protein; (3) digestion with enzymes; (4) two cycles of ultracentrifugation; (5) final ultracentrifugation in a sucrose solution of graded density; and (6) removal of the sugar.

It can readily be seen that such complicated techniques applied to large quantities of dangerously infective virus fluids are not attractive from the point of view of commercial manufacture and that a method which simply and quickly results in an essentially pure virus product would be of great importance.

The disadvantages and hazards of the known methods for purifying and concentrating viral substances are completely overcome by the method of my invention which provides a means for obtaining pure viral substance quickly and simply and in substantially quantitative yields from impure virus-containing fluids or vaccine. The process of my invention shown in FIG. 1 of the accompanying drawings, is based upon a new principle, namely that viral substances can be precipitated quantitatively and in highly purified form from dilute or concentrated impure virus-containing solutions by adding nucleic acid and adjusting the solution to a pH between about 2–4.

While the viral material obtained by this one step precipitation is sufficiently purified and concentrated for use in preparing a vaccine, further purification can be effected by dissolving the precipitated viral material in aqueous buffered solution at a pH range of about 4.5–9, but preferably between pH 6.5–8.5, and then removing the residual nucleic acid and impurities which are primarily proteinaceous materials by digestion of the solution with (1) ribonuclease or (2) ribonuclease and deoxyribonuclease in the presence of magnesium ions (derived from any soluble magnesium salt) which activate the deoxyribonuclease. The digestion is continued for about one hour at about 37° C. and purified ficin (preferably activated by cysteine) is added and digestion continued for an additional hour at about 37° C. These enzymatic digestions, without exerting a deleterious effect upon the viral substance, convert the nucleic acid and proteinaceous materials to such physical and/or chemical forms that they remain soluble during subsequent precipitation of the viral substance. At this stage substantially all of the nucleic acid has been digested but a trace generally remains which is adequate to reprecipitate the viral substance upon adjusting the pH to between 2–4. The precipitated viral substance then can be separated, for example by centrifugation, and the remaining pellet taken up in buffered solution, pH 4.5–9. If desired, the buffered solution of the viral material can be ultracentrifuged and the pellet of viral material taken up in a small quantity of buffered solution, pH 4.5–9. If after the digestion with nuclease and ficin it is found that the viral substance does not precipitate upon adjusting the pH to between about pH 2–4, adjustment of the solution to a greater pH and the addition of a very small quantity of nucleic acid will precipitate the desired viral material upon subsequent reacidification.

The nucleic acid employed in the process of my invention can be of the ribonucleic acid or deoxyribonucleic acid type (that is, plant or animal nucleic acid). That portion of nucleic acid which functions to precipitate the viral substance is the undegraded (or highly polymerized) nucleic acid. This can be obtained from commercially available nucleic acid by purification thereof by the method described below or the crude nucleic acid can be used in larger quantity. For example, 1 gamma (mcg.) per milliliter (ml.) of highly polymerized nucleic acid derived by purification of commercial yeast nucleic acid (Schwarz Laboratories, Inc., Mt. Vernon, New York), is effective in precipitating poliomyelitis virus from its solution in crude, infected monkey kindey tissue culture fluid or other tissue culture fluids. This quantity (1 meg.) can be obtained from approximately 30 mcg. of the crude acid. By adding the latter quantity of crude nucleic acid (30 mcg.) the same effect is achieved without prior purification.

The advantages of the use of nucleic acid to effect concentration of viral substances from tissue culture fluid are manifold: (1) very small quantities are required, 50–200 mg./liter of crude commercial product or 0.5–2 mg./liter of purified product are sufficient to effect the precipitation of the viral substance, higher concentrations can be employed, if desired, although not usually necessary; (2) the nucleic acid is easily obtainable and inexpensive, especially if yeast nucleic acid is used; (3) the precipitate of nucleic acid and virus is readily soluble in neutral aqueous solutions; (4) successive precipitations can be carried out without loss of viral matter; (5) and the nucleic acid can be separated from the virus material by digestion with a nuclease such as ribonuclease or a mixture of ribonuclease and deoxyribonuclease. The split products of the nucleic acid digestion then can be eliminated by dialysis, ultracentrifugation or reprecipitation of viral material by the addition of an alcohol, for example ethanol or methanol, the digestion products remaining in the supernatant.

Subsequent digestion with purified ficin or other proteolytic enzymes, for example, papain, removes proteinaceous impurities. When purified ficin is employed it is advantageously activated by the addition of cysteine which is usually employed in a ratio of 10 parts by weight of cysteine to each part of ficin.

The precipitation of viral material at pH 2–4 in the presence of nucleic acid advantageously is conducted at a temperature between about 1–10° C. While the best pH range lies between 2.0–4.0, the acidity can be increased or decreased to between about pH 1.5 to about pH 4.5 and the virus successfully precipitated provided, when the acidity is increased to about pH 1.5, the step be carried out as quickly as possible to avoid acid degradation of the virus or viral material. The acid employed to adjust the pH can be a mineral acid such as hydrochloric, sulfuric or phosphoric, or an organic acid such as citric, oxalic or other organic acid. Hydrochloric acid is as effective as any acid and as it is a readily available laboratory reagent it was employed in the process described herein as a matter of convenience.

In general, the product obtained at this point represents substantially pure poliovirus, the poliovirus being 80–100% pure. The major impurity, if any, at this point, is the material known to the art as "C component" which is related to the poliovirus, and is, in fact, the outer protein envelope of the virus particle which lacks the central core of nucleic acid. Inactivation of the virus thus obtained by methods known to the art, will result in substantially pure poliovirus antigen. However, if the process is performed using an imperfectly filtered tissue culture fluid or without due care, the product obtained will not be substantially pure. Nevertheless, even under these conditions, the product will contain poliovirus as a major component with respect to the total protein in the concentrate, and inactivation of this product by methods known to the art will yield a vaccine containing poliovirus antigen as the major portion of the total protein in the vaccine. The vaccine so obtained is fully effective for immunization against poliomyelitis disease and could be sold as a marketable product.

The preparation of purified viral material by the method of my invention is of considerable commercial importance because for the first time it is now possible to accomplish its concentration and purification in considerably less time than was needed when employing known procedures, and the virus is obtained in substantially quantitative yields. The purified and concentrated virus which is obtained by the process of my invention if of commercial importance because it can be converted to a purified vaccine largely or wholly freed from undesirable matter. Such vaccine prepared from the purified and concentrated virus obtained by the process of my invention has many advantages over vaccines heretofore prepared, such as (1) superior safety because the reproducibility of extinction of infectivity can be guaranteed by the use of known concentrations of pure virus; (2) absence of undesirable foreign protein; (3) constant, known dosages can be administered in any chosen volume; and (4) for the first time it is possible to incorporate the desired amount of the pure inactivated virus into vaccines containing other antigens all of which then can be administered simultaneously in a feasible single dosage form.

The process of my invention is more fully described in the following examples which illustrate not only the reproducibility of the process but also feasible ranges in which the process is operable.

The examples also illustrate, as another feature of my invention, the preparation of an effective vaccine prepared by inactivation of purified, concentrated poliovirus.

PREPARATION OF REAGENTS EMPLOYED IN PROCESSES DESCRIBED IN EXAMPLES

*Purification of Crude Yeast Nucleic Acid*

Commercially available yeast nucleic acid (10 grams), [obtained from Schwarz Laboratories, Inc., Mt. Vernon, New York, Lot No. NH5704, hereinafter referred to as yeast nucleic acid (Schwarz)], were dissolved in one liter of 1% phosphate buffer (pH 7.0) containing 2% sodium chloride. The pH of this solution was adjusted with 10 N hydrochloric acid to pH 3.0, causing formation of a precipitate which was allowed to settle. The supernatant solution was decanted and the precipitate was redissolved in 100 ml. of 1% phosphate buffer (pH 7.0) containing 2% sodium chloride. The pH of this solution was adjusted to pH 3.0 with 10 N hydrochloric acid and the resulting suspension centrifuged for 15 minutes at 3000 r.p.m. (revolutions per minute) at 2° C. The supernatant solution was discarded and the precipitate was dissolved in 50 ml. of 1% phosphate buffer (pH 7.0) containing 2% sodium chloride. Spectrophotometric examination showed the concentration of purified yeast nucleic acid in the solution to be 300 Mcg./ml. This was a convenient form for use of this material in the preparation of purified, concentrated viral substance.

The yield of purified yeast nucleic acid obtained in this purification procedure (15 mg. from 10 gm. of starting material) was so low that experiments were conducted using the commercially available yeast nucleic acid. The crude material proved satisfactory (see for example, Example 4 below) when used at concentrations forty to one hundred fold that of the purified nucleic acid.

*Purification of Ficin*

Ficin (Merck & Co., Inc., Rahway, New Jersey), 2 grams, was suspended in 20 ml. of acetate buffer (pH 5.0, 0.01 ionic). The suspension was stirred without foaming for one hour resulting in a hazy solution. This solution was centrifuged for 15 minutes at 3000 r.p.m. at 10° C. Two grams of Celite 503, a diatomaceous filter aid manufactured by the Johns-Manville Company, were added to the supernatant solution which then was filtered through paper by gravity. The filtrate was cooled to 1–5° C. and methanol, which had been cooled to —20° C. added with stirring to a final concentration of 40% (v./v., that is, volume per volume). The mixture was kept at —10° C. overnight and then centrifuged, the supernatant discarded and the precipitate extracted with three 5 ml. portions of distilled water, each extraction mixture being centrifuged at 2° C. The pooled extracts were stored at 5° C. for one week then centrifuged to remove the precipitate which formed and the supernatant solution lyophilized. The lyophilized product, which is completely soluble in water, contains 70% of the initial activity.

ASSAY METHOD

In evaluating the efficacy of a purification procedure as applied to viruses, the need for a simple, accurate, precise and prompt assay becomes immediately apparent. In the case of poliovirus, the principal methods of assay in use are based on (*a*) the metabolic inhibition (color) test [also known as infectivity (color) test] described by Salk, Youngner and Ward, American Journal of Hygiene, 60: 214 (1954); (*b*) the plaque forming test described by Hsiung and Melnick, Virology 1: 533 (1955); and (*c*) the complement fixation method (CF) described by Osler, Strauss and Mayer, American Journal of Syphilis, Gonorrhea and Venereal Diseases, 36: 140 (1962). The last of these methods measures total antigenic mass present while the first two methods measure only that minor portion of the antigen mass which is infective. All three methods have been used in this work with good correlation, as shown in Table A below. For reasons of convenience, simplicity and speed it was decided to place chief reliance on the complement fixation (CF) method and that method of assay is used in the examples illustrating the novel process of this invention.

TABLE A.—CORRELATION OF ASSAY MEASURES USED TO FOLLOW PURIFICATION WITH POLIOVIRUS

| Description of material | Color test (X10[6]) | Plaque test (X10[6]) | CF[1] | Ratio: Plaque X10[6]/CF |
|---|---|---|---|---|
| Tissue culture filtrate | 6.3 | 13 | 4 | 3.3 |
| Partially-purified solution | 710 | 960 | 180 | 5.3 |
| Ultracentrifuged supernatant | 870 | 1560 | 320 | 4.9 |
| Purified solution | 13,000 | 17,000 | 4,800 | 3.5 |

[1] CF means complement fixing units, assay according to method described by Osler, et al above.

*Crude Viral Starting Material*

Unless otherwise noted the tissue culture filtrates employed in the following examples were obtained by growing the virus on monkey kidney cells and harvesting by known methods.

EXAMPLE 1

(This example shows that the use of 5 mcg./ml. of purified yeast nucleic acid in the process of this invention results in quantitative concentration and recovery of viral substance)

A tissue culture filtrate containing Type I (Mahoney) poliovirus was found to contain a total of 300 complement fixing (CF) units per 100 ml. To a 100 ml. aliquot of this tissue culture filtrate, 1.67 ml. of a 300 mcg./ml. solution of yeast nucleic acid (Schwarz) purified as described above, was added giving an overall concentration of 5 mcg./ml. of purified yeast nucleic acid. This solution was cooled to 5° C., adjusted to pH 2.5 with 1 N hydrochloric acid, centrifuged 15 minutes at 3000 r.p.m. at 2° C. The supernatant was decanted and the pellet dissolved in 5 ml. of 1% phosphate buffer (pH 7.0) containing 2% sodium chloride. The supernatant was found to contain no CF units while the solution of the pellet contained a total of 320 CF units indicating a volume concentration of twenty-fold with no loss of activity.

As a control, another 100 ml. aliquot of this solution was cooled to 5° C., adjusted to pH 2.5 with 1 N hydrochloric acid and centrifuged 15 minutes at 3000 r.p.m. at 2° C. The supernatant was decanted and the pellet dissolved in 5 ml. of 1% phosphate buffer (pH 7.0) containing 2% sodium chloride. The supernatant was found to contain a total of 200 CF units; the solution of the pellet contained none, indicating that no concentration was achieved.

EXAMPLE 2

(This example shows that the minimum concentration of purified yeast nucleic acid required for substantially quantitative precipitation of poliovirus from tissue culture filtrates is more than 1.25 mcg./ml. and probably less than 2.5 mcg./ml.)

To four 100 ml. aliquots of a tissue culture filtrate containing Type III (Saukett) poliovirus and having a CF activity of 250 units/100 ml. there was added decreasing amounts (1.67, 0.84, 0.42, 0.21 ml.) of the 300 mcg./ml. solution of yeast nucleic acid (Schwarz), purified by the process described above, to give final solution concentrations of purified yeast nucleic acid of 5 mcg./ml., 2.5 mcg./ml., 1.25 mcg./ml. and 0.625 mcg./ml. respectively. All the aliquots were cooled to 5° C., adjusted to pH 2.5 with 1 N hydrochloric acid, centrifuged 15 minutes at 3000 r.p.m. at 2° C. The supernatants were discarded and each of the pellets dissolved separately in 5 ml. of 1% phosphate buffer (pH 7.0) containing 2% sodium chloride. The solutions of the pellets were assayed with the results shown in Table B below:

TABLE B

| Final solution concentration of purified yeast nucleic acid (mcg./ml.) | Total CF units in solution of pellet | Percent of initial activity present in solution of pellet |
|---|---|---|
| 5.0 | 240 | 96 |
| 2.5 | 240 | 96 |
| 1.25 | 140 | 56 |
| 0.625 | 25 | 10 |

EXAMPLE 3

(This example shows that poliovirus precipitated with purified yeast nucleic acid is stable under the conditions tested (pH 2.5, 5° C.) for at least 21 hours)

To a 500 ml. portion of the same tissue culture filtrate containing Type III (Saukett) poliovirus used in Example 2, which contained 250 CF units per 100 ml., 8.33 ml. of a 300 mcg./ml. solution of yeast nucleic acid (Schwarz), purified as described above, were added to give a final concentration of 5 mcg./ml. The solution was cooled to 5° C. and then adjusted with 1 N hydrochloric acid to pH 2.5, causing formation of a precipitate, and the mixture then was stored at 5° C. At the time intervals stated in Table C below, the mixture was stirred to suspend the precipitated material and a 100 ml. aliquot removed. Each aliquot was centrifuged 15 minutes at 3000 r.p.m. at 2° C. The supernatant was discarded and the pellet dissolved in 5 ml. of 1% phosphate buffer (pH 7.0) containing 2% sodium chloride. The solutions of the pellets were assayed by the complement fixation test with the results shown below:

TABLE C

| Time (hours) | Total CF units in solution of pellet | Percent of initial activity present in solution of pellet |
|---|---|---|
| 0.5 | 240 | 96 |
| 1.0 | 240 | 96 |
| 2.0 | 240 | 96 |
| 4.0 | 200 | 80 |
| 21.0 | 240 | 96 |

EXAMPLE 4

(This example shows that commercially available crude yeast nucleic acid can be used to precipitate poliovirus from tissue culture filtrates in a substantially quantitative yield and demonstrates that the minimum concentration required to achieve this yield is greater than 25 mcg./ml. and probably less than 50 mcg./ml.)

To four 100 ml. aliquots of the same tissue culture filtrate [Type III (Saukett) poliovirus] used in Example 2, having an activity of 250 CF units per 100 ml., was added in decreasing quantities (1, 0.5, 0.25 and 0.125 ml.) of a 20 mg./ml. solution of crude yeast nucleic acid (Schwarz) thus providing final yeast nucleic acid concentrations given in Table D. All the aliquots were cooled to 5° C., adjusted to pH 2.5 with 1 N hydrochloric acid and centrifuged 15 minutes at 3000 r.p.m. at 2° C. The supernatants were discarded and each pellet dissolved separately in 5 ml. of 1% phosphate buffer (pH 7.0) containing 2% sodium chloride. The solutions of the pellets were assayed with the results shown in Table D below:

TABLE D

| Concentration of commercially-available yeast nucleic acid (mcg./ml.) | Total CF units in solution of pellet | Percent of initial activity present in solution of pellet |
|---|---|---|
| 200 | 280 | 112 |
| 100 | 280 | 112 |
| 50 | 320 | 128 |
| 25 | 200 | 80 |

EXAMPLE 5

(This example shows that the pH of the nucleic acid precipitation can be more alkaline than pH 2.5, at least up to pH 3.5)

Ten ml. of a 20 mg./ml. solution of yeast nucleic acid (Schwarz) were added to one liter of a tissue culture filtrate containing Type III (Saukett) poliovirus, having an activity of 4000 CF units per liter, to give a concentration of yeast nucleic acid of 200 mcg./ml. This solution was cooled to 5° C., adjusted to pH 3.5 with 1 N hydrochloric acid and allowed to settle at 5° C. for 18 hours. Approximately 900 ml. of clear supernatant were decanted and the remaining sediment centrifuged 15 minutes at 3000 r.p.m. at 2° C. The clear supernatant was discarded and the pellet dissolved in 10 ml. of 1% phosphate buffer (pH 7.0) containing 2% sodium chloride. The solution of the pellet was assayed and found to contain a total of 4000 CF units, indicating 100% recovery of the activity initially present in the tissue culture filtrate, and in 1/100 of the original volume.

EXAMPLE 6

(This example shows that incubation of a concentrated solution of poliovirus with 100 mcg./ml. of purified ficin is not destructive of the infectivity or complement fixation properties of the virus)

Five ml. of a 20 mg./ml. solution of yeast nucleic acid (Schwarz) were added to one liter of a tissue culture filtrate containing Type III (Saukett) poliovirus to give a concentration of 100 mcg./ml. The solution was cooled to 5° C. and adjusted to pH 2.5 with 1 N hydrochloric acid and allowed to settle at 5° C. for 18 hours. The clear supernatant was decanted and the sediment centrifuged 15 minutes at 3000 r.p.m. at 2° C. The supernatant was discarded and the pellet dissolved in 10 ml. (1/100 the original volume) of 1% phosphate buffer (pH 7.0) containing 2% sodium chloride. A portion of this solution was assayed for infectivity and complement fixation with the results shown in Table E, item (1) below. The remainder of the solution was incubated for one hour at 37° C. with 1 mg. of purified ficin prepared by the method described above plus 10 mgs. of cysteine (to activate the ficin) dissolved in 1 ml. of water. After this incubation the solution was assayed for infectivity and CF with the results shown in the table, item (2) below:

TABLE E

| Nature of sample | Infectivity color test [$TCID_{50}$] per ml. | CF units (per ml.) |
|---|---|---|
| (1) Concentrated solution of poliovirus | $1\times10^{8.75}$ | 280 |
| (2) Above solution after digestion with 100 mcg./ml. of purified ficin | $1\times10^{8.75}$ | 240 |

EXAMPLE 7

(This example describes removing the nucleic acid and residual proteins remaining in the virus pellet by digestion with ribonuclease and further digestion with ficin)

Tissue culture filtrate containing Type III (Saukett) poliovirus, one liter, containing a total of 4000 CF units was cooled to 5° C. Yeast nucleic acid (Schwarz), 10 ml. of a 20 mg./ml. solution of crude nucleic acid (Schwarz) to give a final solution concentration of 200 mcg./ml. of nucleic acid, was added and the pH adjusted to 3.5 with 1 N hydrochloric acid. The solution was allowed to stand at 5° C. for 18 hours, the supernatant then was discarded and the sediment centrifuged 15 minutes at 3000 r.p.m. at 2° C. The supernatant was discarded and the pellet dissolved in 10 ml. of a 1% phosphate buffer (pH 7.0) containing 2% sodium chloride. Upon assay this solution was shown to contain a total of 4000 CF units. This concentrated solution of poliovirus was digested with ribonuclease (10 mcg./ml.) for one hour at 37° C. An assay of the solution following digestion with ribonuclease showed it to contain a total of 3600 CF units. Purified ficin (100 mcg./ml., prepared as described above) and 1 mg./ml. of cysteine was added to the digestion mixture and digestion continued for an additional hour at 37° C. Assay of the solution following digestion with ficin showed it to contain a total of 2800 CF units. The solution then was cooled to 5° C., diluted with 1.5 volumes of cold distilled water and the pH adjusted to 2.5 with 1 N hydrochloric acid and centrifuged for 15 minutes at 3000 r.p.m. at 2° C. The supernatant was discarded and the pellet dissolved in 11.5 ml. of 1% phosphate buffer (pH 7.0) containing 2% sodium chloride. An assay of this solution showed it contained a total of 2800 CF units.

EXAMPLE 8

(This example describes preparation of pure poliovirus by nucleic acid precipitation at pH 3.5, followed by digestion with ribonuclease then with purified ficin and reprecipitation at pH 2.5 followed by ultracentrifugation to yield pure poliovirus)

Tissue culture filtrate containing Type III (Saukett) poliovirus, 2 liters, containing a total of 7000 CF units was cooled to 5° C. Yeast nucleic acid (Schwarz), 10 ml. of a 20 mg./ml. solution of yeast nucleic acid (Schwarz) to give a final solution concentration of 100 mcg./ml. of nucleic acid, was added and the pH adjusted to 3.5 with 1 N hydrochloric acid. The solution was allowed to stand at 5° C. for 18 hours, the supernatant then was discarded and the sediment centrifuged 15 minutes at 3000 r.p.m. at 2° C. The supernatant was discarded and the pellet dissolved in 10 ml. of a 1% phosphate buffer (pH 7.0) containing 2% sodium chloride. Upon assay this solution was shown to contain a total of 6400 CF units. This concentrated solution of poliovirus was digested with ribonuclease (10 mcg./ml.) for one hour at 37° C. An assay of the solution following digestion with ribonuclease showed it to contain a total of 4800 CF units. Purified ficin (100 mcg./ml., prepared as described above) and cysteine (1mg./ml.) were added to the above mixture and digestion continued an additional hour at 37° C. Assay of the solution following digestion with ficin showed it to contain a total of 400 CF units. The solution then was cooled to 5° C., diluted with 1.5 volumes of cold distilled water, the pH adjusted to 2.5 with 1 N hydrochloric acid and centrifuged for 15 minutes at 3000 r.p.m. at 2° C. The supernatant was discarded and the pellet dissolved in 11.5 ml. of 1% phosphate buffer (pH 7.0) containing 2% sodium chloride. This solution assayed a total of 4000 CF units. The thus obtained solution was centrifuged three hours at 40,000 r.p.m. at 2° C. The supernatant was discarded, the pellet dissolved in 5 ml. of 1% phosphate buffer (pH 7.0) containing 2% sodium chloride, again centrifuged for 10 minutes at 10,000 r.p.m. at 2° C. and the pellet thus obtained dissolved in 10 ml. of 1% phosphate buffer (pH 7.0) containing 2% sodium chloride. This solution assayed 3500 CF units.

Table F below summarizes the testing data in the above example at the end of each step of the process described.

TABLE F

| Nature of sample | Volume (ml.) | Total CF units | Percent initial activity |
|---|---|---|---|
| Original tissue culture filtrate | 2,000 | 7,000 | 100 |
| Supernatant from pH 3.5 precipitation | 2,000 | ---------- | ---------- |
| Solution of pH 3.5 precipitate | 10 | 6,400 | 91 |
| Above solution after digestion with ribonuclease | 10 | 4,800 | 69 |
| Above solution after digestion with purified ficin | 10 | 4,000 | 57 |
| Supernatant from pH 2.5 precipitate | 25 | <500 | <7 |
| Solution of pH 2.5 precipitate | 11.5 | 4,000 | 57 |
| Ultracentrifuged supernatant | 11.5 | 550 | 8 |
| Solution of ultracentrifuged pellet | 10 | 3,500 | 50 |

The purity of the poliovirus obtained by the process described in this example was established by a comparison of its ultra-violet spectrum with the spectrum published by Schwerdt and Schaffer, Annals of the New York Academy of Science, 61: 740 (1955)(1). The spectrum for the pure poliovirus prepared by the process of this invention and that prepared by Schwerdt and Schaffer is shown in FIG. 2 of the accompanying drawings. A comparison of these spectra demonstrates that the spectrums are the same, with a maximum at wave length 260 mμ and a minimum at wave length 241 mμ.

EXAMPLE 9

(This example describes removing the nucleic acid and residual proteins remaining in the virus pellet by digestion with a mixture of ribonuclease and deoxyribonuclease and further digestion with ficin)

Tissue culture filtrate containing Type III (Saukett) poliovirus, 500 ml., containing a total of 1750 CF units, was cooled to 5° C. Yeast nucleic acid (Schwarz), 5 ml. of a 20 mg./ml. solution of yeast nucleic acid (Schwarz) to give a final solution concentration of 200 mcg./ml. of nucleic acid, was added and the pH adjusted to 3.5 with 1 N hydrochloric acid. The solution was allowed to stand at 5° C. for 20 hours, the supernatant then was discarded and the sediment centrifuged 15 minutes at 3000 r.p.m. at 2° C. The supernatant was discarded and the pellet dissolved in 10 ml. of 1% phosphate buffer (pH 7.0) containing 2% sodium chloride. Upon assay this solution was shown to contain a total of 2000 CF units. This concentrated solution of poliovirus was digested for one hour at 37° C. with a mixture of ribonuclease (10 mcg./ml.), deoxyribonuclease (10 mcg./ml.) and magnesium sulfate ($MgSO_4 \cdot 7H_2O$, 10 mg./ml.). An assay of the solution following digestion with a mixture of ribonuclease and deoxyribonuclease showed it to contain a total of 1600 CF units. Purified ficin (25 mcg./ml., prepared as described above) and cysteine (250 mcg./ml.) were added to the above mixture and digestion continued an additional hour at 37° C. Assay of the solution following digestion with ficin showed it to contain a total of 2400 CF units. The solution then was cooled to 5° C., diluted with 2 volumes of cold distilled water, the pH adjusted to 2.5 with 1 N hydrochloric acid and then centrifuged for 15 minutes at 3000 r.p.m. at 2° C. The supernatant was discarded and the pellet dissolved in 10 ml. of 1% phosphate buffer (pH 7.0) containing 2% sodium chloride. Assay of this solution showed it to contain 2660 CF units.

EXAMPLE 10

(This example shows that the nucleic acid precipitation method of this invention can be used to concentrate virus grown on cells other than monkey kidney cells)

Type III (Saukett) virus was grown on rhesus testicular cells by conventional methods. When the cultures were harvested, the cellular debris was removed by centrifugation. An aliquot of the clear tissue culture fluid was dialyzed against 0.85% sodium chloride solution to permit its being measured in the complement fixation test, sample MT–61 Table G below, (undialyzed material could not be used because of color interference). To another 100 ml. aliquot of the clear virus containing fluid, 1 ml. of a 20 mg./ml. solution of yeast nucleic acid (Schwarz) was added, thus providing a final concentration of 200 mcg./ml. of yeast nucleic acid (Schwarz). The solution was cooled to 5° C., adjusted to pH 2.5 with 1 N hydrochloric acid, centrifuged 15 minutes at 3000 r.p.m. at 2° C. The supernatant was discarded and the pellet dissolved in 10 ml. (1/10 original volume) of 1% phosphate buffer (pH 7.0) containing 2% sodium chloride. The solution of the pellet was submitted for CF testing with the results shown in Table G below, sample MT–61–C. Two additional aliquots were treated identically as described above and assayed with the results given in the following table for samples MT–62 and MT–62–C.

TABLE G

| Nature of sample | CF units per ml. | Indicated recovery of activity, percent |
|---|---|---|
| MT–61, original fluid (dialyzed) | 12 | ---------- |
| MT–61–C, solution of pellet from above | 128 | 100 |
| MT–62, original fluid (dialyzed) | 25 | ---------- |
| MT–62–C, solution of pellet from above | 256 | 100 |

EXAMPLE 11

(This example shows that the nucleic acid precipitation method of this invention preferentially concentrates the viral antigen rather than anti-complementary material and thereby permits use of the CF test in these studies)

Some virus-containing fluids contain so much anti-complementary material (see, for example Boyd, W. C., Fundamentals of Immunology, 2nd edition (1947), page 298; Interscience Publishers, Inc., New York, N.Y.), that, even after dialysis, they can not be measured in the complement fixation test. This is a serious handicap in those studies whose purpose is the growth of increased amounts of viral antigen. Type II (MEF–1) poliovirus was grown on rhesus testicular cells. When the culture was harvested, the cellular debris was removed by centrifugation. An aliquot of the clear virus-containing supernatant was dialyzed against 0.85% sodium chloride solution for measurement in the CF test. To another 100 ml. aliquot of this clear virus-containing supernatant there was added 1.67 ml., of the 300 mcg./ml. solution of yeast nucleic acid (Schwarz) purified by the process described above to give a final concentration of 5 mcg./ml. of the purified yeast nucleic acid. The virus-containing solution then was cooled to 5° C., adjusted to pH 2.5 with 1 N hydrochloric acid and centrifuged 15 minutes at 3000 r.p.m. at 2° C. The supernatant was discarded and the pellet dissolved in 10 ml. (1/10 original volume) of 1% phosphate buffer (pH 7.0) containing 2% sodium chloride. The dialyzed original fluid [Table H, item (1)] and the 10-fold concentrate resulting from solution of the pellet [Table H, item (2)] were assayed for infectivity by the color and plaque tests and for CF with the results shown in Table H below:

TABLE H

| Nature of sample | Infectivity by color test | Infectivity by plaque test | Percent recovery indicated by infectivity tests | CF per ml. |
|---|---|---|---|---|
| (1) Original fluid (dialyzed) | $10^{7.0}$ | $1 \times 10^7$ | ---------- | (1) |
| (2) 10-fold concentration from above | $10^{8.0}$ | $1 \times 10^8$ | 100 | 56 |

1 Anticomplementary.

The data in Table H indicate that: (1) nucleic acid can be used to precipitate poliovirus from viral fluids whose origin was other than monkey kidney cells: (2) the concentrations achieved by the nucleic acid precipitation method are quantitative; (3) the data obtained by infectivity measurements as well as CF measurements establish the effectiveness of the nucleic acid precipitation method; and (4) the nucleic acid precipitation method concentrates viral antigen in preference to anticomplementary matter permitting use of the CF test in viral growth studies. This is an analytical aid of considerable importance because of the greater convenience and precision it confers.

EXAMPLE 12

(This example demonstrates that the yeast nucleic acid precipitation method of this invention can be used to concentrate non-infective antigen from vaccines, thus providing a method for readily measuring antigen content in those vaccines containing insufficient concentration of antigen to be measured by the complement fixation test)

Commercially prepared poliomyelitis vaccine (Merck Sharp & Dohme, Lot No. 29252), 900 ml., was used. This gave negative results on CF test when tested after appropriate dialysis to remove color. Yeast nucleic acid (Schwarz), 9 ml., in the form of a 20 mg./ml. solution, was added to give a final solution concentration of 200 mcg./ml. The solution was cooled to 5° C. then adjusted to pH 2.5 with 1 N hydrochloric acid and set aside at 5° C. for 18 hours. The clear supernatant was decanted and the remaining sediment centrifuged for 15 minutes at 3000 r.p.m. at 2° C. The supernatant was discarded and the pellet dissolved in 10 ml. of 0.85% sodium chloride solution. This solution was tested for infectivity (by color test) and also tested by complement fixation. No infectivity was found. The following CF values were obtained against Type I—35 (total), indicating 0.39 per ml. in the original
Type II—12.5 (total), indicating 0.14 per ml. in the original
Type III—10 (total), indicating 0.11 per ml. in the original

EXAMPLE 13

(This example shows that the nucleic acid precipitation method can be used to concentrate infective virus present in a vaccine from a level undetectable by the color test to one which is readily detectable. It offers a means of making the safety testing of vaccines more sensitive and less laborious, inasmuch as the entire product from several liters of vaccine can be tested in a few small tissue culture flasks)

To one liter of the vaccine at 5° C., described in Example 12, there was added 10 ml. of a 20 mg./ml. solution of yeast nucleic acid (Schwarz) to give a final concentration of 200 mcg./ml. To this solution there was added 1,000 tissue culture infective doses ($TCID_{50}$) of Type III (Saukett) poliovirus yielding a virus concentration of 10°, i.e. 1.0, $TCID_{50}$/ml. The pH of this solution was adjusted to 2.5 with concentrated hydrochloric acid. It was allowed to stand 17–18 hours at 5° C. The clear supernatant was decanted and the remaining sediment centrifuged 15 minutes at 3000 r.p.m. at 2° C. The supernatant was discarded and the pellet dissolved in 10 ml. of the nutrient solution used in the infectivity (color) test. This solution was tested for infectivity and complement fixation. Infectivity titer was $10^{1.25}$, i.e. 17.8, $TCID_{50}$/ml.; CF values were identical with those reported in Example 12.

EXAMPLE 14

(This example describes the preparation of effective vaccines prepared by the formaldehyde inactivation of two different Type I strains of pure poliovirus)

A batch of monkey kidney cells, monolayer cultures, were prepared. Half of the flasks were seeded with Mahoney poliovirus and the remaining half with Parker poliovirus. From the infected fluids obtained upon harvesting the cultures, pure virus of each type was isolated having an ultra-violet absorption spectrum identical with that given for the pure virus prepared by the method of Example 8. Each pure virus was dissolved in 1% phosphate buffer, pH 7.0, at a concentration of 20 mcg./ml. These solutions of virus were inactivated by adding formaldehyde (1:4000 formalin) to a concentration of 92.5 mcg./ml., placing in vials which are completely filled with solution and sealed, wrapped in aluminum foil to exclude light, and incubating at 37° C. for 168 hours. The contents of the vials then were diluted 1:5 with 0.85% sodium chloride solution, thus providing a concentration of 1 mcg. of inactivated virus per ml. This mixture is hereinafter referred to as the vaccine. A small portion of each vaccine was dialyzed at 5° C. about 18 hours against 0.85% sodium chloride solution and then 24 hours against the nutrient solution used in the infectivity (color) test. The results of the infectivity test of each vaccine were negative. These vaccines were tested for effectiveness in monkeys by the procedure established by the National Institutes of Health (NIH) and described in the Federal Register, volume 21, No. 128, page 4924, paragraph 73.103, July 3, 1956, with the exception that, for each vaccine, dosages of 1 ml. of the monovalent vaccine were employed and 8 monkeys per test were used, all 8 monkeys surviving the test in each case. The geometric mean ratio calculated from the data thus obtained for the vaccine prepared from pure Mahoney poliovirus was 0.76, and that from the vaccine prepared from pure Parker poliovirus was 0.54; NIH minimum ratio requirement, 0.29.

EXAMPLE 15

(This example gives the physical and chemical properties of the non-infective poliomyelitis antigen)

The physical and chemical properties of the non-infective antigen prepared by inactivation of poliovirus, purified by the novel method of my invention, have been determined on a representative sample of antigen by known analytical methods. The data thus obtained characterize the antigen within the precision of these analytical procedures with high molecular weight protein substances. The antigen was prepared by the inactivation of poliovirus, substantially completely free from non-poliovirus protein, by essentially the same method described in Example 14.

The elemental analysis, infrared and ultraviolet spectra provide useful data for the characterization of the non-infective antigen.

The carbon and hydrogen analyses were made by the Pregl combustion method modified by use of tungstic oxide as catalyst, described in "Organic Quantitative Microanalysis," Niederl and Niederl (1942), pages 101–150. The nitrogen determination was by the method of Johnson described in "Monometric Techniques," 3rd edition (1957), page 238, published by Burgess Publishing Company. Analysis for phosphorus was by the method of Fiske and Subba Row, "Methods in Enzymology," vol. III (1957), page 843, Academic Press Inc. Sulfur was determined by dry combustion according to the method of Steyermark, "Quantitative Organic Microanalysis" (1951), pages 167–177, followed by volumetric titration by method of Ogg, Willits and Cooper, described in their paper, "Volumetric determination of small amounts of soluble sulfates," in Analytical Chemistry, vol. 20 (1948), page 83. The analytical sample used was a lyophilized, non-infective poliomyelitis antigen which was dried to constant weight over $P_2O_5$ at room temperature. The non-infective polio antigen, analyzed by the above procedures and apparatus, was found to contain the following elements in the proportions specified, calculated on a moisture-free basis at its isoelectric point:

| | Percent |
|---|---|
| Carbon | 49.74 |
| Hydrogen | 6.71 |
| Nitrogen | 16.16 |
| Phosphorus | 3.18 |
| Sulfur | 1.57 |
| Oxygen | [1] 22.64 |

[1] By difference.

Figure 3:
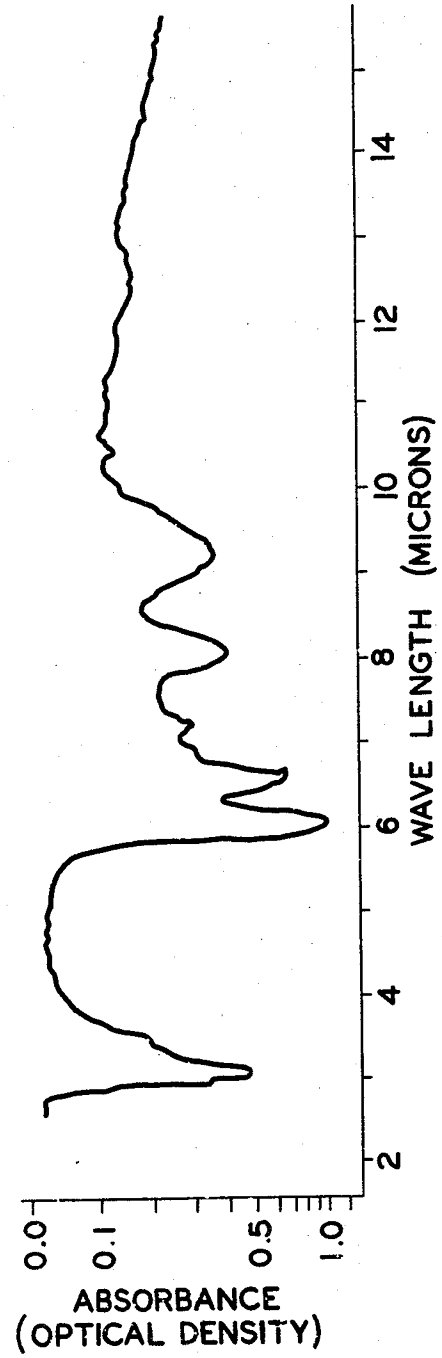
Figure 4:
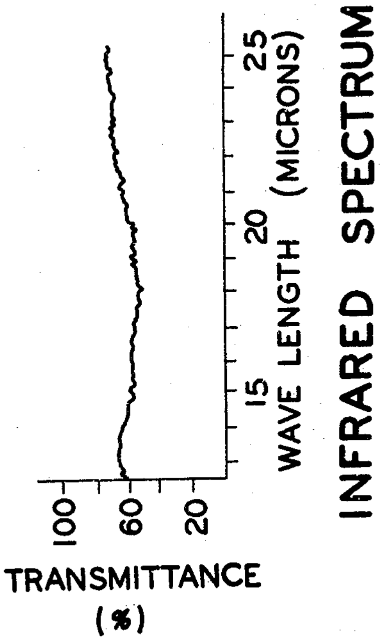

The infrared spectrum of the antigen, shown in FIG. 3 and FIG. 4 of the attached drawings, was determined in a Perkin & Elmer Corp. infrared spectrophotometer Model 21 and Model 137 KBr prism spectrophotometer.

When mixed in a KBr pellet in the ratio of approximately 1 part of antigen to 350 parts KBr, the antigen shows a number of characteristic maxima in the infrared region, the more significant of which are the following:

| Wave length | Percent transmission | Absorbance |
|---|---|---|
| 3,250 | 34 | .480 |
| 2,910 | 56 | .251 |
| 1,654 | 9 | 1.05 |
| 1,515 | 22.5 | .630 |
| 1,450 | 49.5 | .304 |
| 1,385 | 52 | .240 |
| 1,235 | 40 | .398 |
| 1,080 | 45 | .350 |
| 960 | [2] 76.5 | .125 |
| [1] 800 | [3] 70 | .155 |

[1] Region.
[2] Weak band.
[3] Broad and weak.

Figure 5:
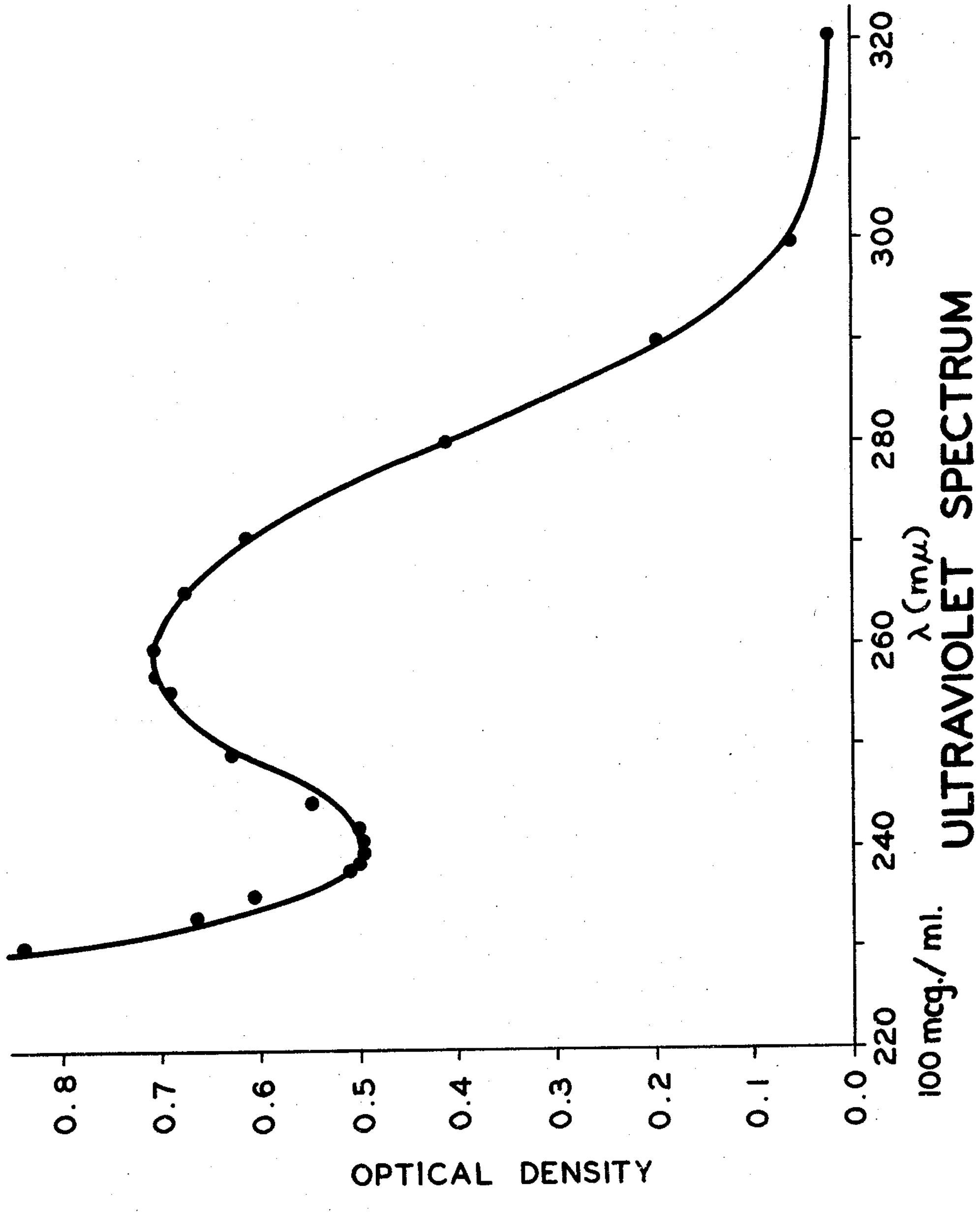

The ultraviolet absorption spectrum, shown in FIG. 5 of the attached drawings, of a sample of the antigen was determined (Beckman Quartz Spectrophotometer, Model DU) in 1% phosphate buffer, pH 7.0, in 1.00 cm. cells. The following data were obtained:

| | Millimicra |
|---|---|
| Maximum absorption | 259–261 |
| Minimum absorption | 241 |

$$\text{Ratio}\ \frac{\text{maximum}}{280\ (\text{protein peak})}=1.63$$

$$\text{density}\ (\lambda\ 260)\ \Sigma^{1\%}_{1\,\text{cm.}}=82.5$$

The ratio given above bears upon the freedom from foreign protein. All proteins have an absorption peak at 280 millimicra. In a product having an absorption at a different wave length but likely to contain foreign protein, the ratio of absorption at the maximum to absorption at 280 has significance.

In addition to the above data which is useful to characterize the non-infective poliomyelitis antigen, the values for particle size, particle count per unit weight, sedimentation coefficient, diffusion coefficient and molecular weight, together with data bearing on biological specificity, especially specific complement fixing ability and immunizing capacity are more pertinent for the characterization of the poliomyelitis antigen.

The size of the non-infective antigen particle was found to be 28 millimicrons, and the number of particles per microgram of antigen was found to be $9.34\times10^{10}$ when determined by the methods described by C. E. Hall, "Introduction to Electron Microscopy" (1953), pages 369–373 (McGraw-Hill Book Co.). The data was obtained on a Phillips Model 100A Electron Microscope.

Sedimentation studies of the antigen were performed on a Spinco Model E analytical ultracentrifuge using an A–N rotor. The methods used for computing the sedimentation coefficient, diffusion coefficient, and molecular weight are described by H. K. Schachman, "Methods in Enzymology," vol. IV (1957), pages 32–77 and 102–103. The data obtained for the antigen by these methods are:

| | |
|---|---|
| Sedimentation coefficient | $D_{20_W}$, $155\times10^{-10}$ per sec. |
| Diffusion coefficient | $D_{20_W}$, $1.89\times10^{-8}$ per cm. per sec. |
| Molecular weight | 6,500,000. |

Assay by complement fixation of each of the three types of antigen, by the method hereinbefore described, gave the following results.

| | Units/mcg. |
|---|---|
| Type I component: | |
| vs. Type I antiserum | 2.5 (positive) |
| vs. Type II antiserum | <0.25 (negative) |
| vs. Type III antiserum | <0.25 (negative) |
| Type II component: | |
| vs. Type II antiserum | 5.7 (positive) |
| vs. Type I antiserum | <0.5 (negative) |
| vs. Type III antiserum | <0.5 (negative) |
| Type III component: | |
| vs. Type III antiserum | 3.0 (positive) |
| vs. Type I antiserum | <0.037 (negative) |
| vs. Type II antiserum | <0.037 (negative) |

A vaccine containing non-infective polio antigen, prepared by inactivating poliovirus purified and concentrated by the process of this invention was administered to 35 triple-negative children, i.e., children who by neutralization test were demonstrated to possess no immunity against any of the three types of polio. The vaccine contained 3.0 mcg. per 0.5 ml. Type I, 0.6 mcg. per 0.5 ml. Type II, and 1.0 mcg. per 0.5 ml. Type III, and was administered in two doses of 0.5 ml. each 1 month apart. One month following the second dose, a sample of blood was taken to determine the titre of antibody produced. Each child was found to have a positive titre to each of the types of poliovirus as shown in the following table.

TABLE I

| No. of triple neg. children | Conversion vs. type | | | |
|---|---|---|---|---|
| | I | | II | III |
| | Parker | Mahoney | | |
| 35 | 34(97%) | 32(92%) | 35(100%) | 32(92%) |

This application is a continuation-in-part of my copending U.S. patent application, Serial No. 660,170, filed May 20, 1957, now abandoned.

While the invention has been illustrated by certain specific examples which illustrate the purification and concentration of poliovirus, the preparation of a non-infective poliomyelitis antigen therefrom and the preparation of a vaccine suitable for administering the antigen to immunize against poliomyelitis, it is to be understood that modifications in the procedural steps and in the reagents used can be made within the framework of the general disclosure and of the appended claims.

What is claimed is:

1. A process for purifying and concentrating poliomyelitis viral substances from poliomyelitis viral substance-containing fluids, comprising adding nucleic acid to the poliomyelitis viral substance-containing fluid and adjusting the pH to between 2–4 and recovering the precipitated poliomyelitis viral substance.

2. A process for purifying and concentrating poliomyelitis viral substances from poliomyelitis viral substance-containing fluids, comprising adding nucleic acid to the poliomyelitis viral substance-containing fluid and adjusting the pH to 3.5 and recovering the precipitated poliomyelitis viral substance.

3. A process for purifying and concentrating poliomyelitis virus from poliomyelitis virus-containing tissue culture filtrates comprising adding nucleic acid to the poliomyelitis virus-containing tissue culture filtrate and adjusting the pH to between 2–4 and recovering the precipitated poliomyelitis virus.

4. A process for purifying and concentrating poliomyelitis virus from poliomyelitis virus-containing tissue culture filtrates comprising adding nucleic acid to the poliomyelitis virus-containing tissue culture filtrate and adjusting the pH to 3.5 and recovering the precipitated poliomyelitis virus.

5. A process for purifying and concentrating poliomyelitis virus from poliomyelitis virus-containing tissue culture filtrates comprising adding yeast nucleic acid to the poliomyelitis virus-containing tissue culture filtrate and adjusting the pH to between 2–4 and recovering the precipitated poliomyelitis virus.

6. A process for purifying and concentrating poliomyelitis virus from poliomyelitis virus-containing tissue culture filtrates comprising adding yeast nucleic acid in a quantity sufficient to provide the equivalent of at least about 2.5 mcg./ml. of purified nucleic acid to the poliomyelitis virus-containing tissue culture filtrate and adjusting the pH to 3.5 and recovering the precipitated poliomyelitis virus.

7. A process for preparing concentrated, pure poliomyelitis virus from poliomyelitis virus-containing tissue culture filtrates comprising adding nucleic acid to the poliomyelitis virus-containing tissue culture filtrate and adjusting the pH to between 2–4, recovering the precipitated poliomyelitis virus and digesting a buffered solution of the virus with ribonuclease and then with purified ficin activated by cysteine, then adjusting the pH to between 2–4 and recovering pure poliomyelitis virus.

References Cited in the file of this patent

UNITED STATES PATENTS

| | | |
|---|---|---|
| 2,946,724 | Valentine | July 26, 1960 |
| 2,966,443 | Cox | Dec. 27, 1960 |

OTHER REFERENCES

Schwerdt and Schaffer: Annals of the New York Academy of Sciences, pp. 740–753, 1955.

Schaffer: Advances in Virus Research, 1959, pp. 181 and 203.

Rivers et al.: Viral and Rickettsial Infections of Man, page 37, pub. 1959, J. B. Lippincott Co., Philadelphia, Pa.

Murray: Proceeding of the 5th International Poliomyelitis Conference, Copenhagen, Denmark, July 26–28, 1960.

Hilleman et al.: Proc. 88th Annual Meeting Am. Pub. Health A., Nov. 1, 1960.

Bulletin of the World Health Organization, vol 22, page 263, 1960.